US00RE48886E

(19) United States
(12) Reissued Patent
Paredes

(10) Patent Number: US RE48,886 E
(45) Date of Reissued Patent: Jan. 11, 2022

(54) SECURITY LIGHT

(71) Applicant: HeathCo LLC, Bowling Green, KY (US)

(72) Inventor: Apollo Paul Paredes, Livonia, MI (US)

(73) Assignee: HEATHCO LLC, Bowling Green, KY (US)

(21) Appl. No.: 29/735,692

(22) Filed: May 22, 2020

Related U.S. Patent Documents

Reissue of:
(64) Patent No.: Des. 835,335
Issued: Dec. 4, 2018
Appl. No.: 29/601,835
Filed: Apr. 26, 2017

U.S. Applications:
(63) Continuation of application No. 29/722,734, filed on Jan. 31, 2020, now Pat. No. Re. 48,386, which is an application for the reissue of Pat. No. Des. 835,335.

(51) LOC (13) Cl. ..... 26-99
(52) U.S. Cl.
USPC ..... D26/120
(58) Field of Classification Search
USPC .... D26/24, 51, 61, 63, 65, 72, 80, 118, 120, D26/128

(Continued)

(56) References Cited

U.S. PATENT DOCUMENTS

D264,253 S * 5/1982 Goldschmidt ..... D26/63
4,380,792 A * 4/1983 Terrell ..... F21V 21/30 362/249.1

(Continued)

OTHER PUBLICATIONS

Photograph of product packaging at least as early as Mar. 23, 2017 Mar. 23, 2017.

(Continued)

*Primary Examiner* — Darlington Ly
(74) *Attorney, Agent, or Firm* — Middleton Reutlinger

(57) CLAIM

The ornamental design for a security light, as shown and described.

DESCRIPTION

FIG. 1 is a [lower] *bottom* perspective view of a [first embodiment of a] security light showing the new design;
FIG. 2 is a rear perspective view [of the security light design of FIG. 1] *thereof*;
FIG. 3 is a front *elevation* view [of the security light design of FIG. 1] *thereof*;
FIG. 4 is a rear *elevation* view [of the security light design of FIG. 1] *thereof*;
FIG. 5 is a left side *elevation* view [of the security light design of FIG. 1] *thereof*;
FIG. 6 is a right side *elevation* view [of the security light design of FIG. 1] *thereof*;
FIG. 7 is a top *plan* view [of the security light design of FIG. 1] *thereof*; and,
FIG. 8 is a bottom *plan* view [of the security light design of FIG. 1] *thereof*.
[FIG. 9 is a lower perspective view of a second embodiment of a security light showing the new design;]
[FIG. 10 is a rear perspective view of the security light design of FIG. 9;]
[FIG. 11 is a front view of the security light design of FIG. 9;]
[FIG. 12 is a rear view of the security light design of FIG. 9;]
[FIG. 13 is a left side view of the security light design of FIG. 9;]
[FIG. 14 is a right side view of the security light design of FIG. 9;]
[FIG. 15 is a top view of the security light design of FIG. 9; and,]
[FIG. 16 is a bottom view of the security light design of FIG. 9.]
[FIG. 17 is a lower perspective view of a third embodiment of a security light showing the new design;]

(Continued)

[AMENDED]

[FIG. 18 is a rear perspective view of the security light design of FIG. 17;]
[FIG. 19 is a front view of the security light design of FIG. 17;]
[FIG. 20 is a rear view of the security light design of FIG. 17;]
[FIG. 21 is a left side view of the security light design of FIG. 17;]
[FIG. 22 is a right side view of the security light design of FIG. 17;]
[FIG. 23 is a top view of the security light design of FIG. 17; and,]
[FIG. 24 is a bottom view of the security light design of FIG. 17.]
The broken lines [represent unclaimed] *in the drawings illustrate* portions of the security light *that form no part of the claimed design*.

1 Claim, 24 Drawing Sheets

Figure 9:
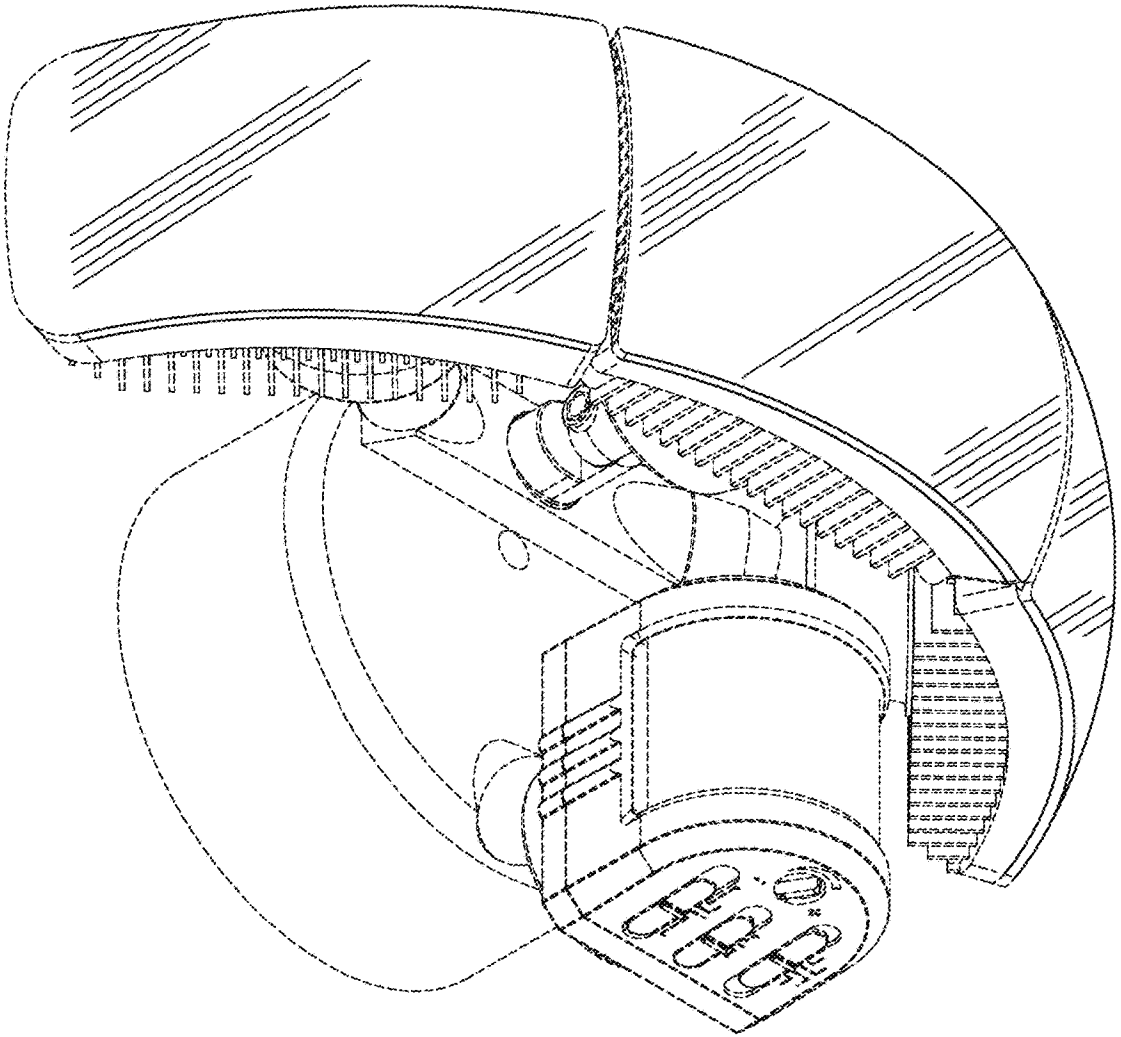
Figure 10:
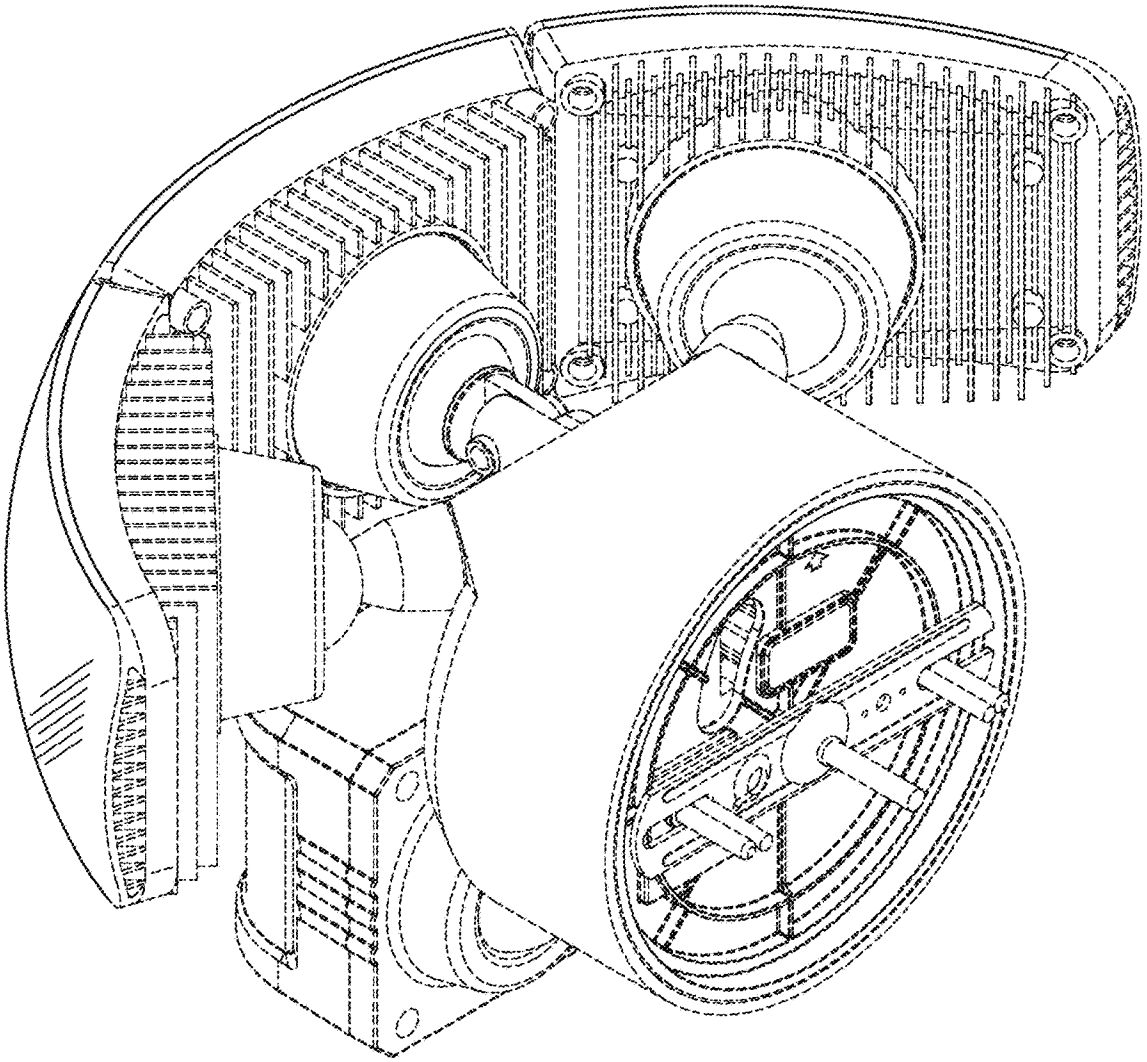
Figure 11:
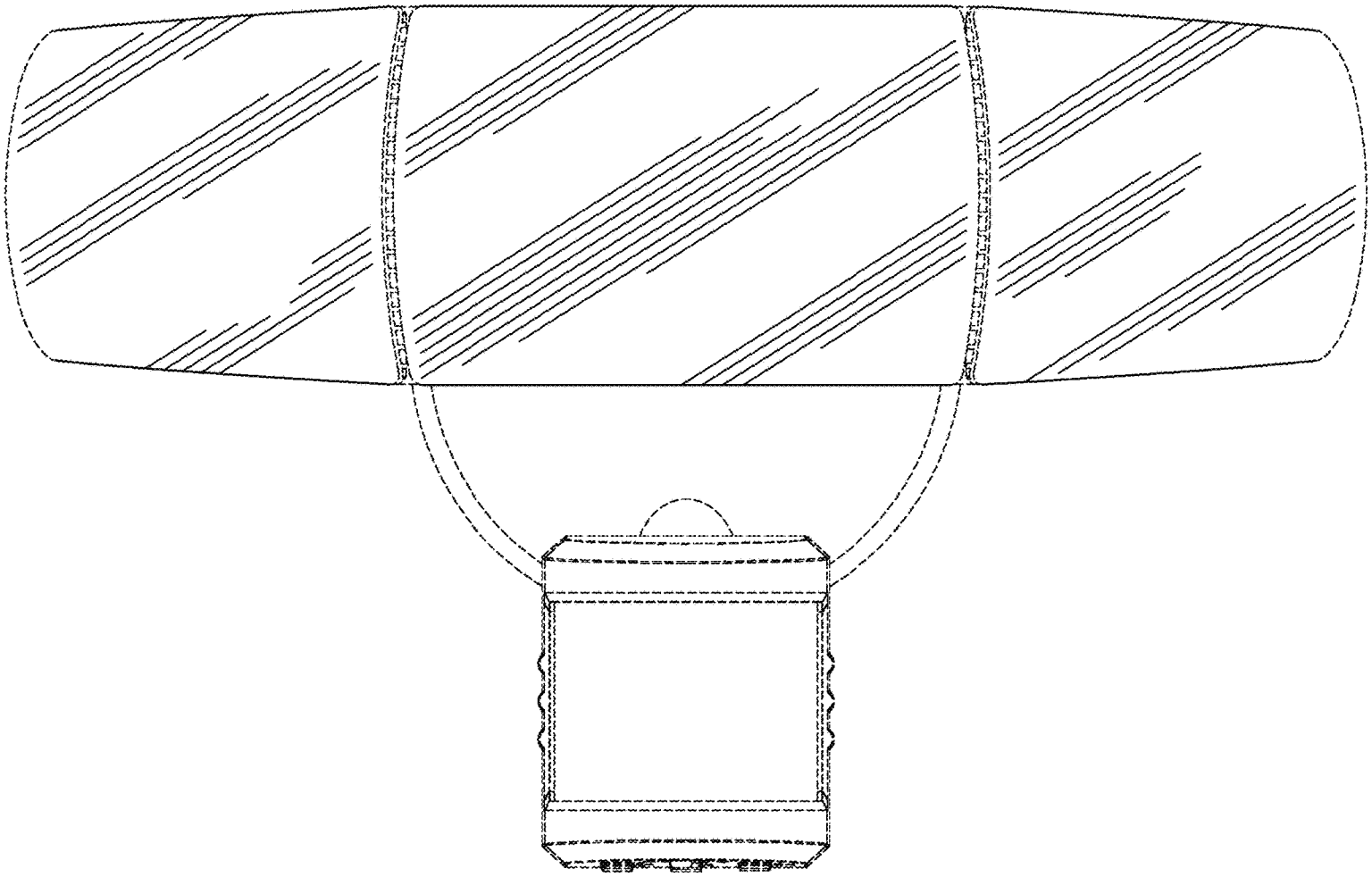
Figure 12:
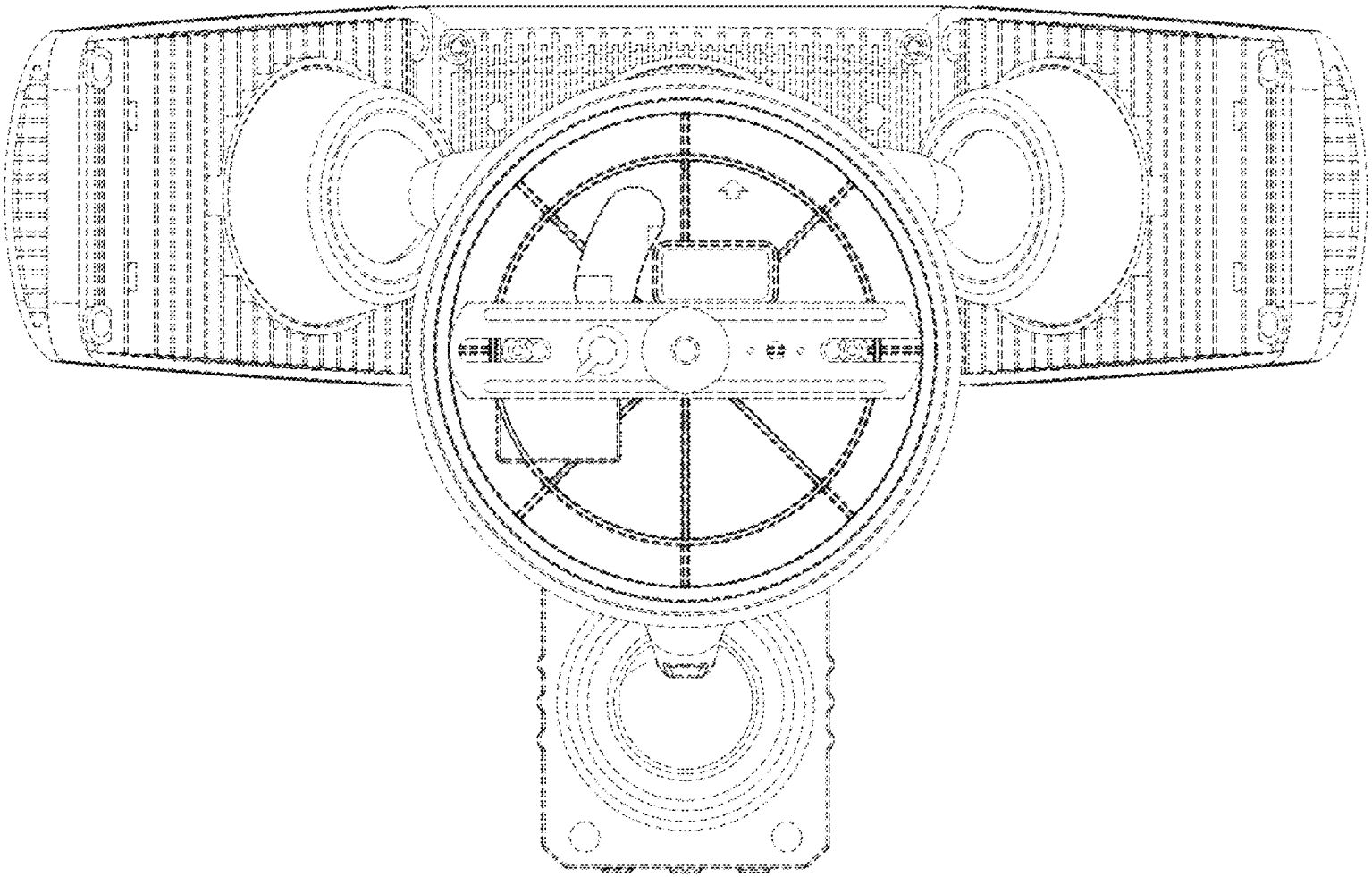
Figure 13:
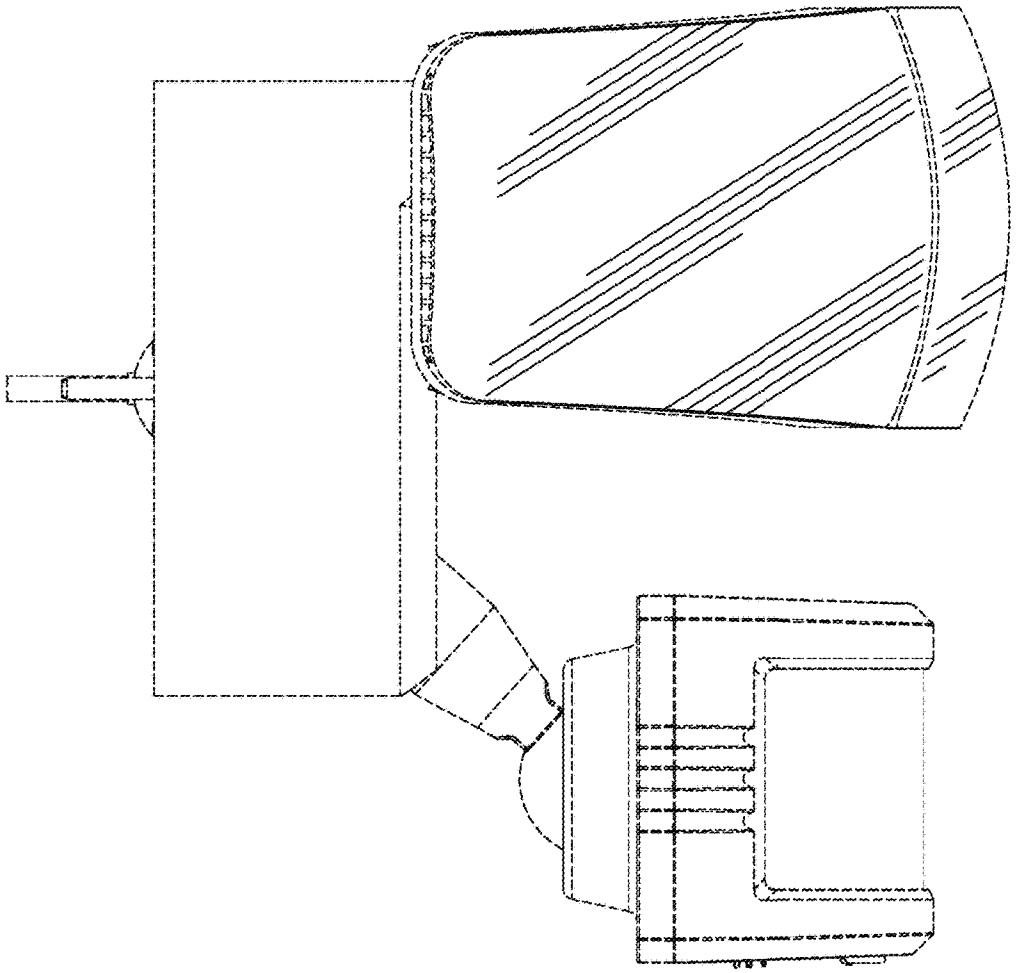
Figure 14:
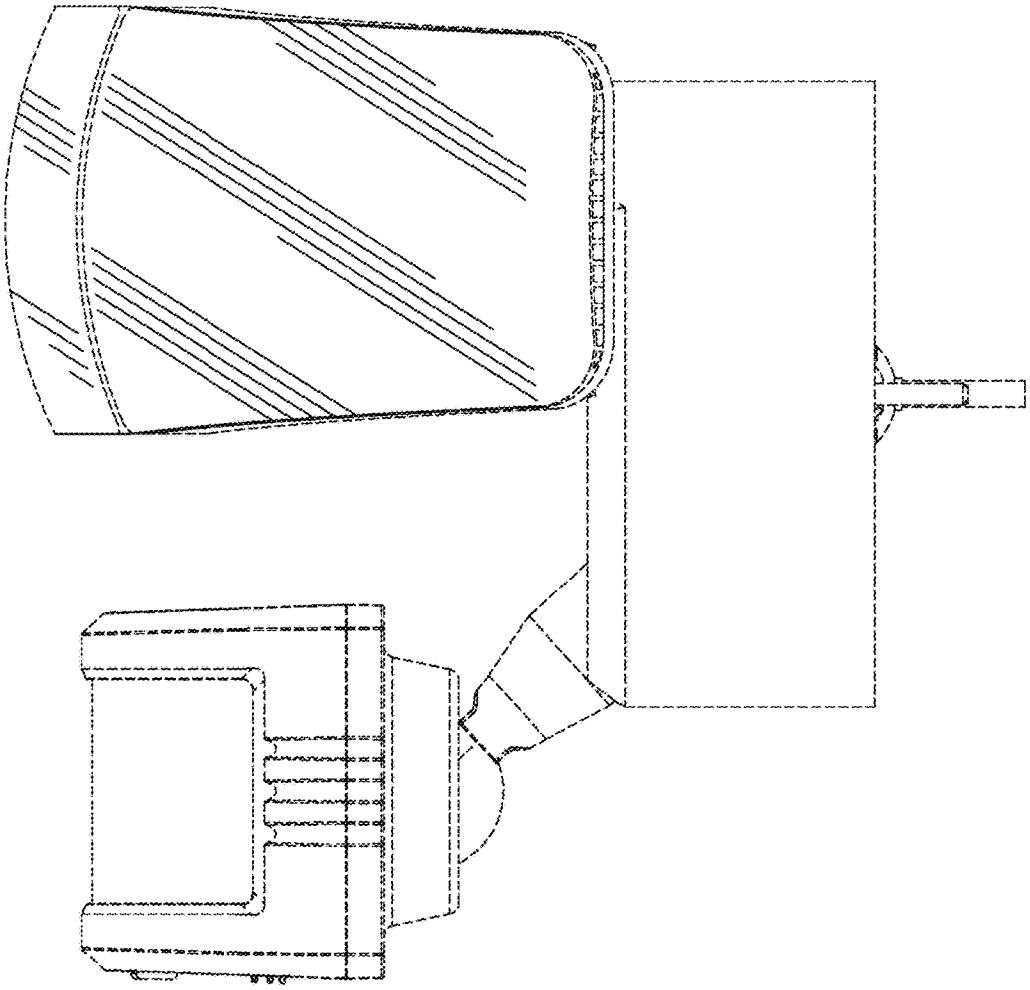
Figure 15:
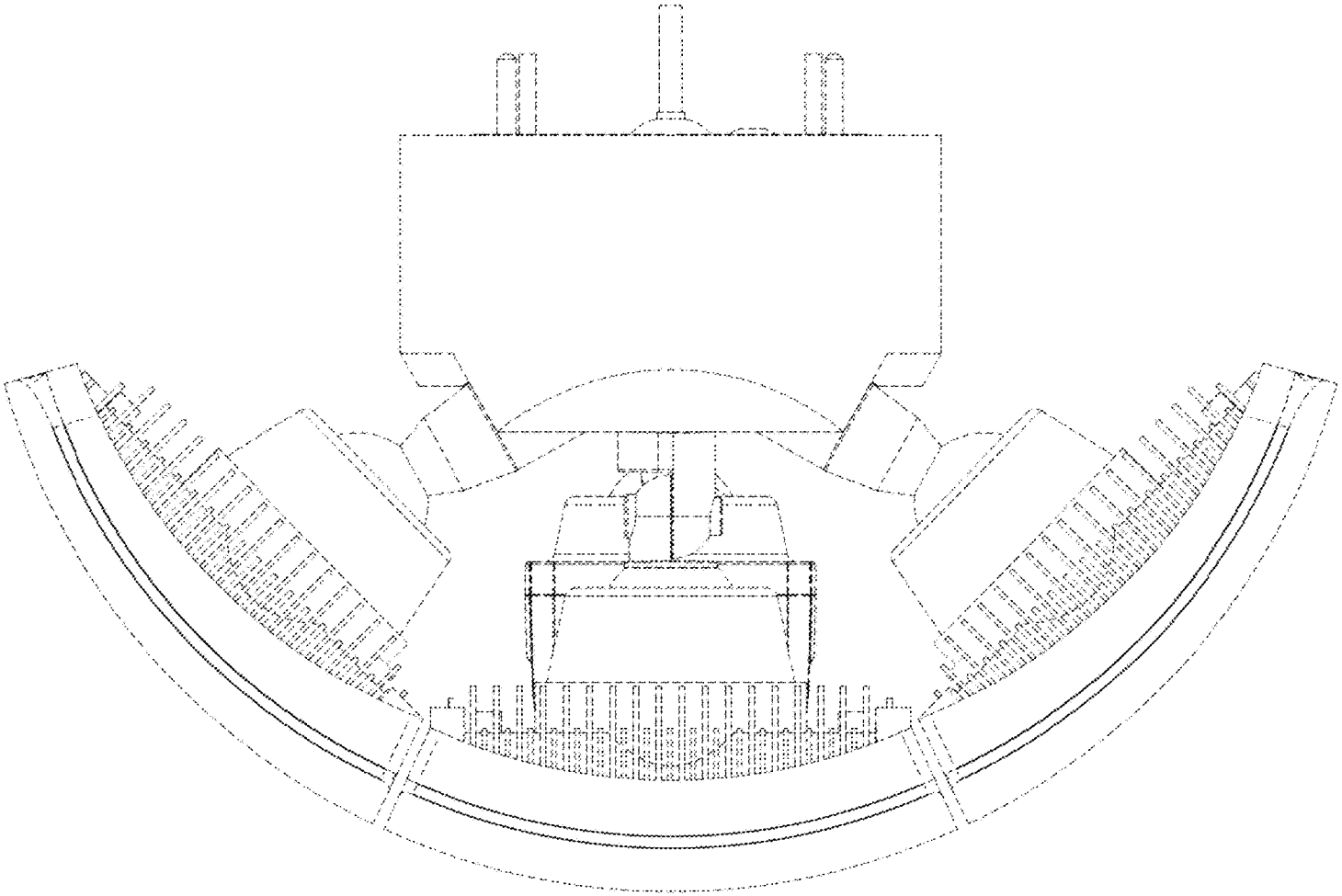
Figure 16:
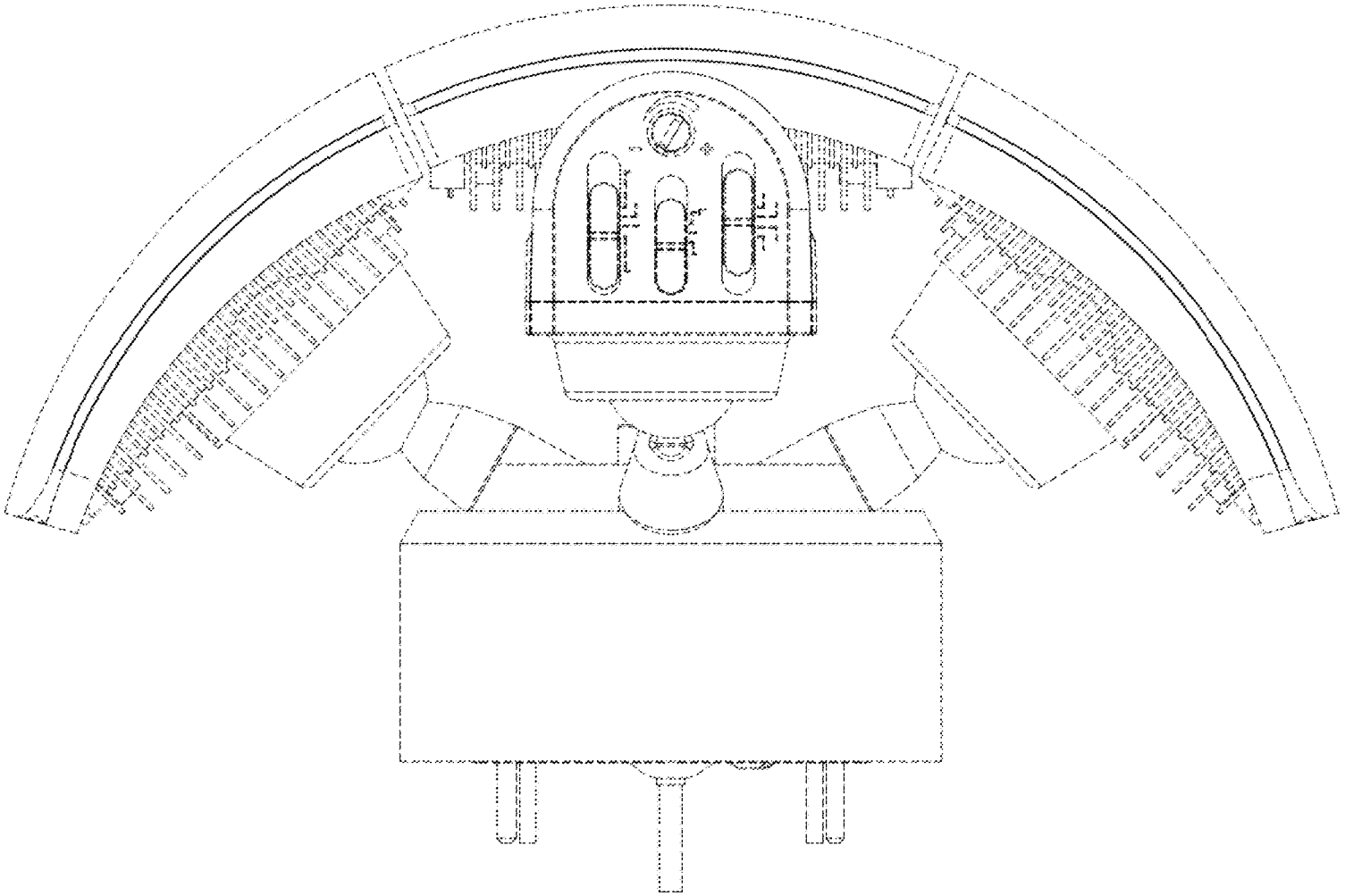
Figure 17:
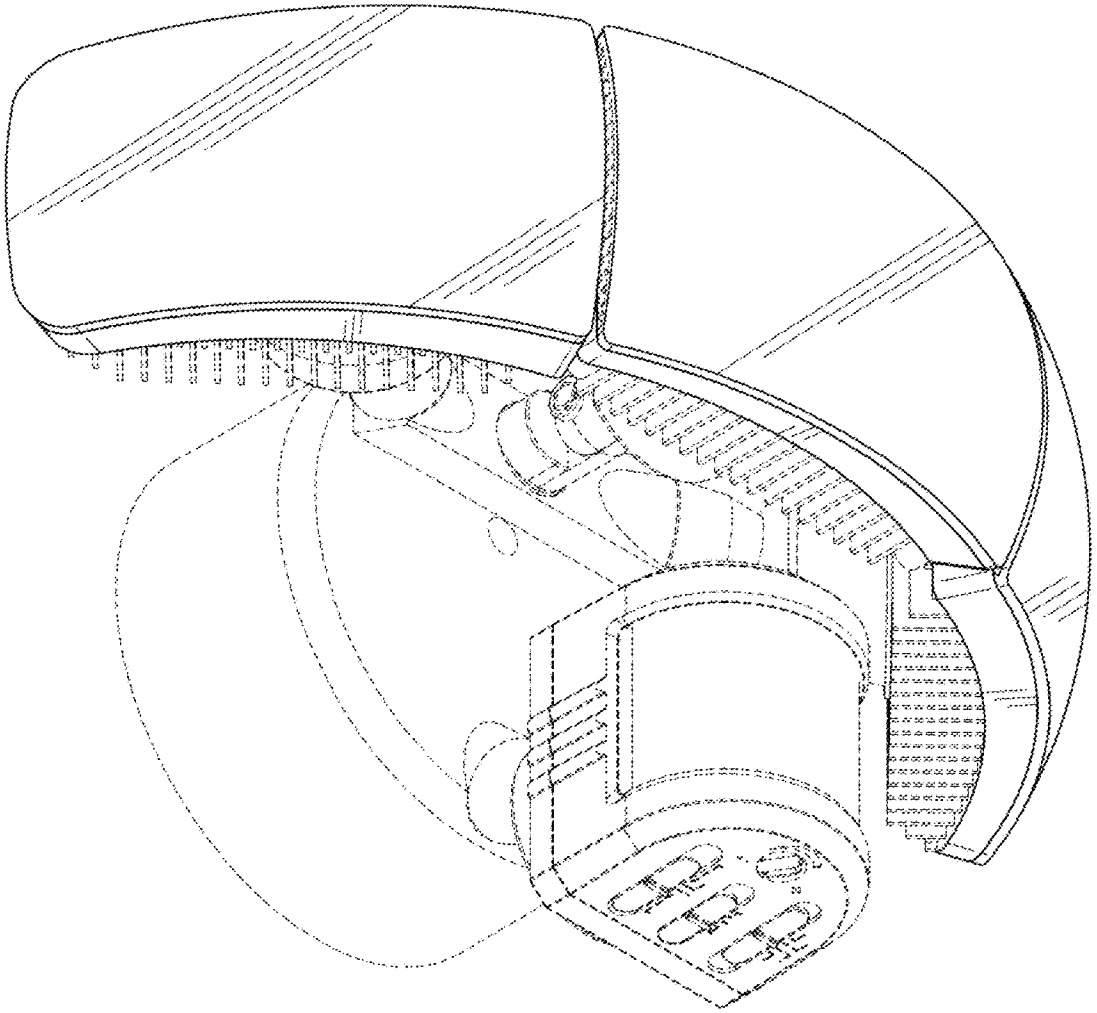
Figure 18:
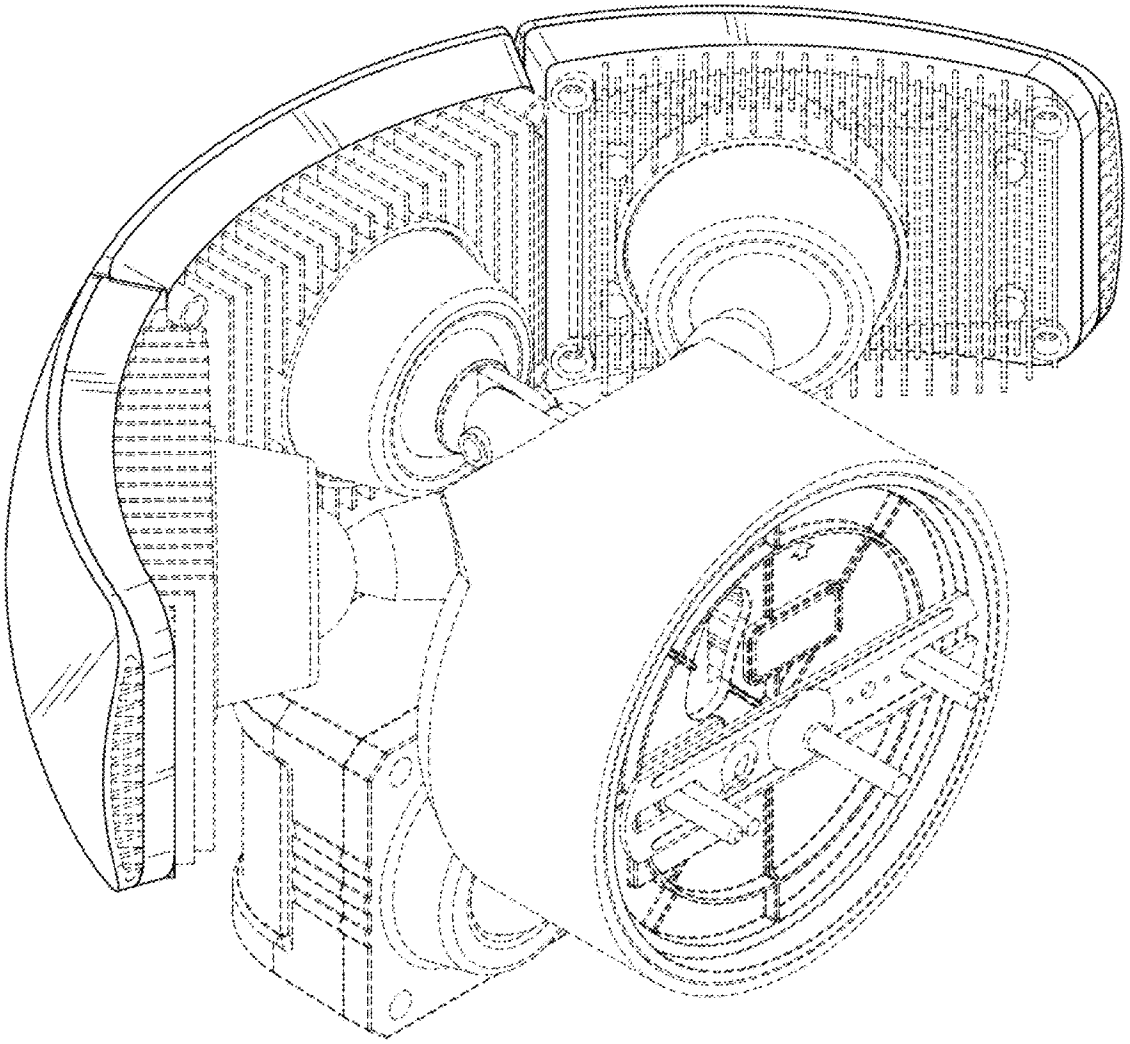
Figure 19:
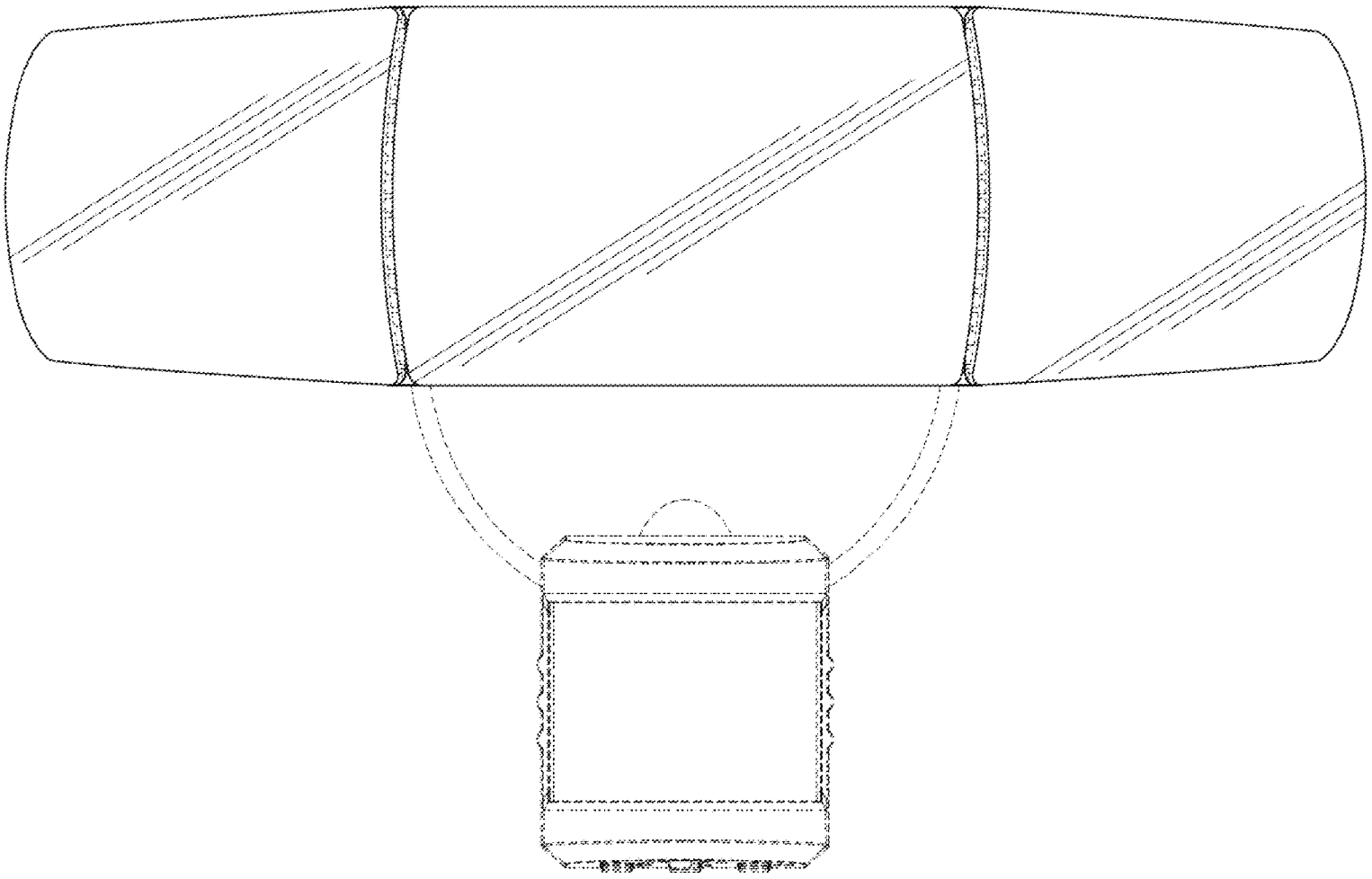
Figure 20:
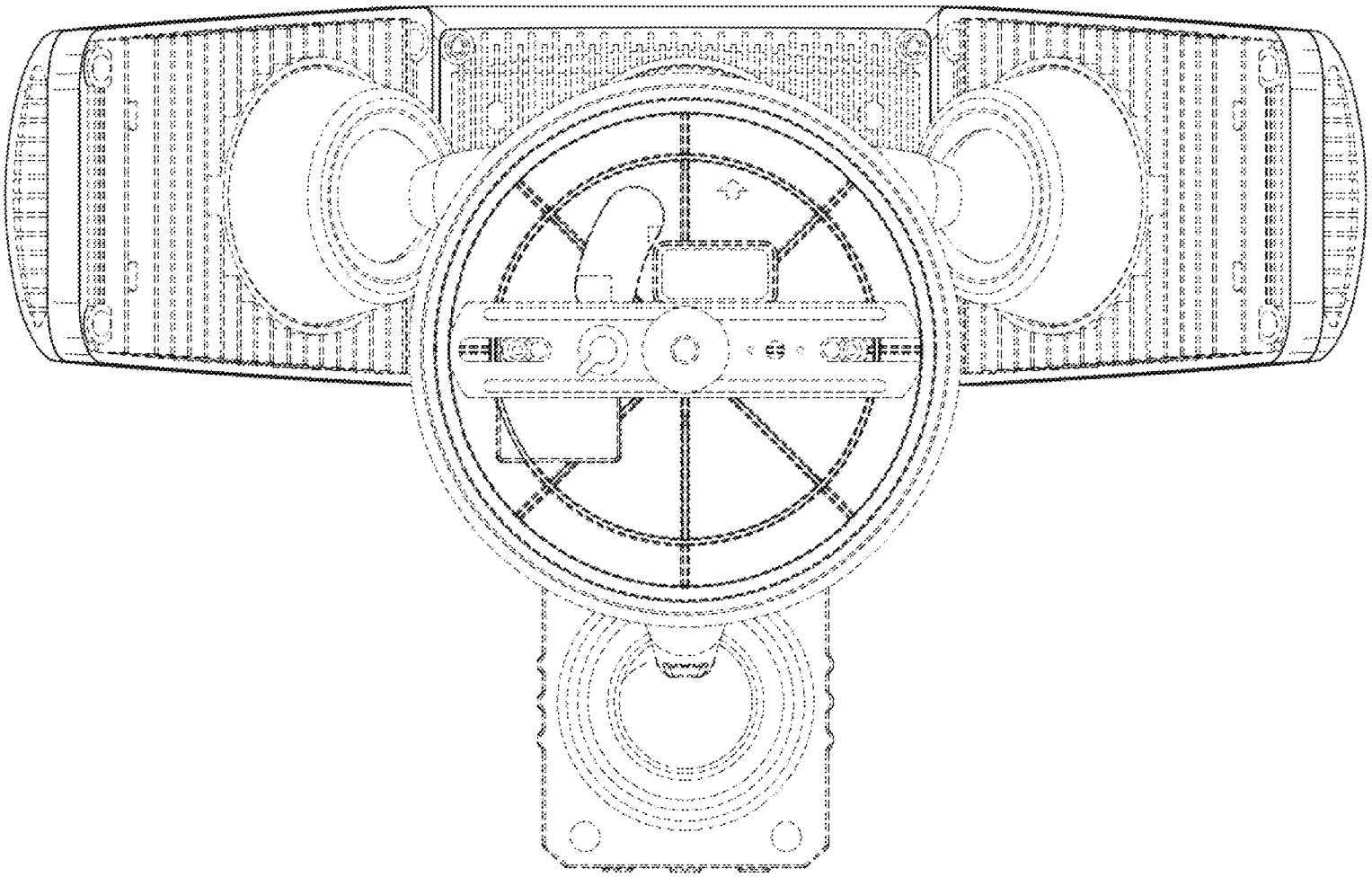
Figure 21:
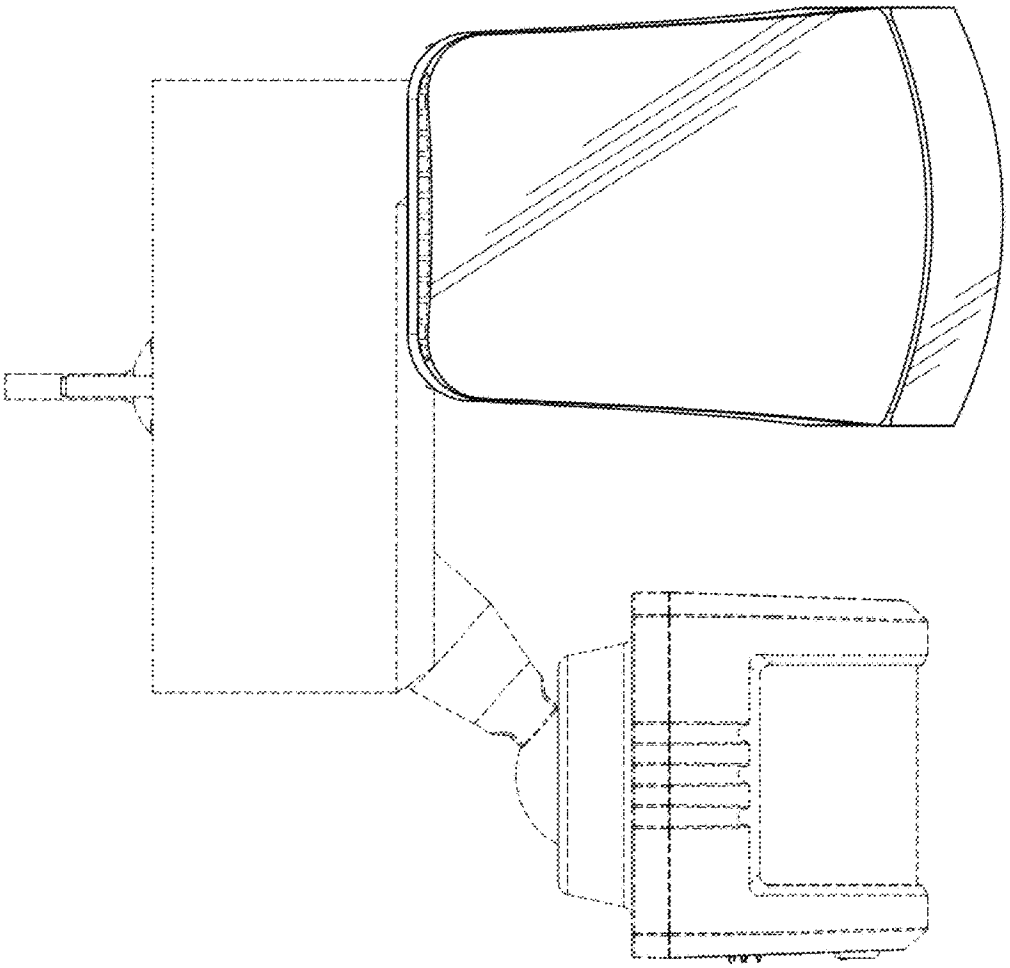
Figure 22:
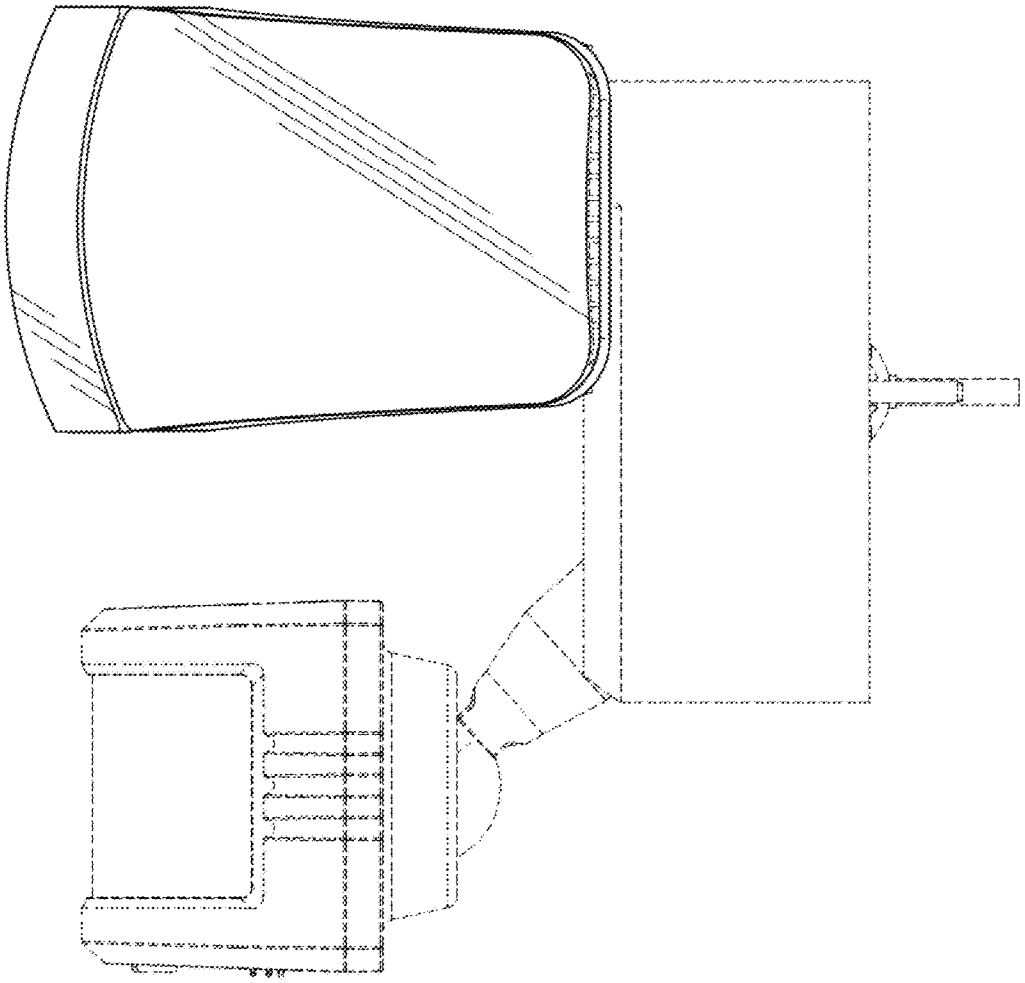
Figure 23:
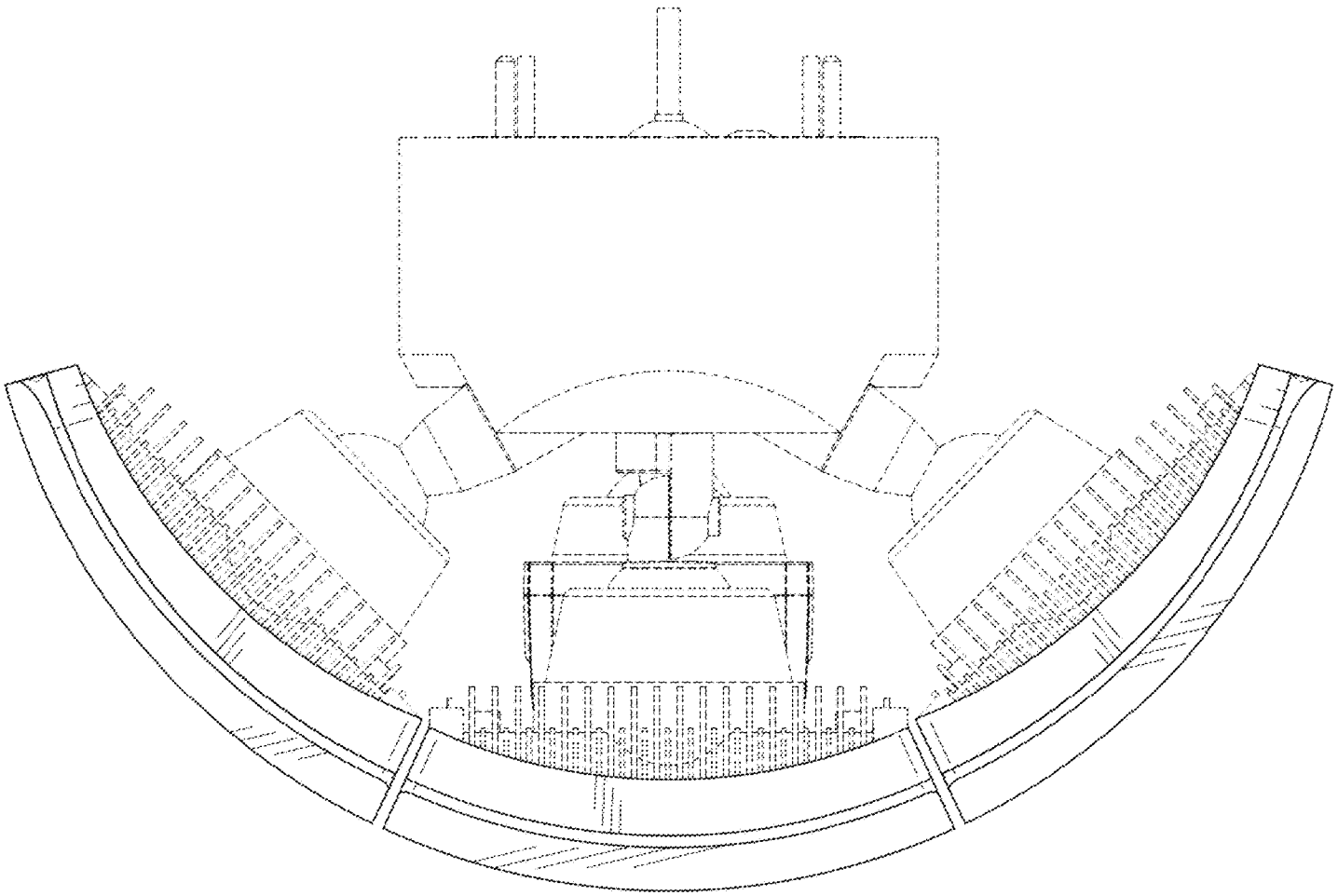
Figure 24:
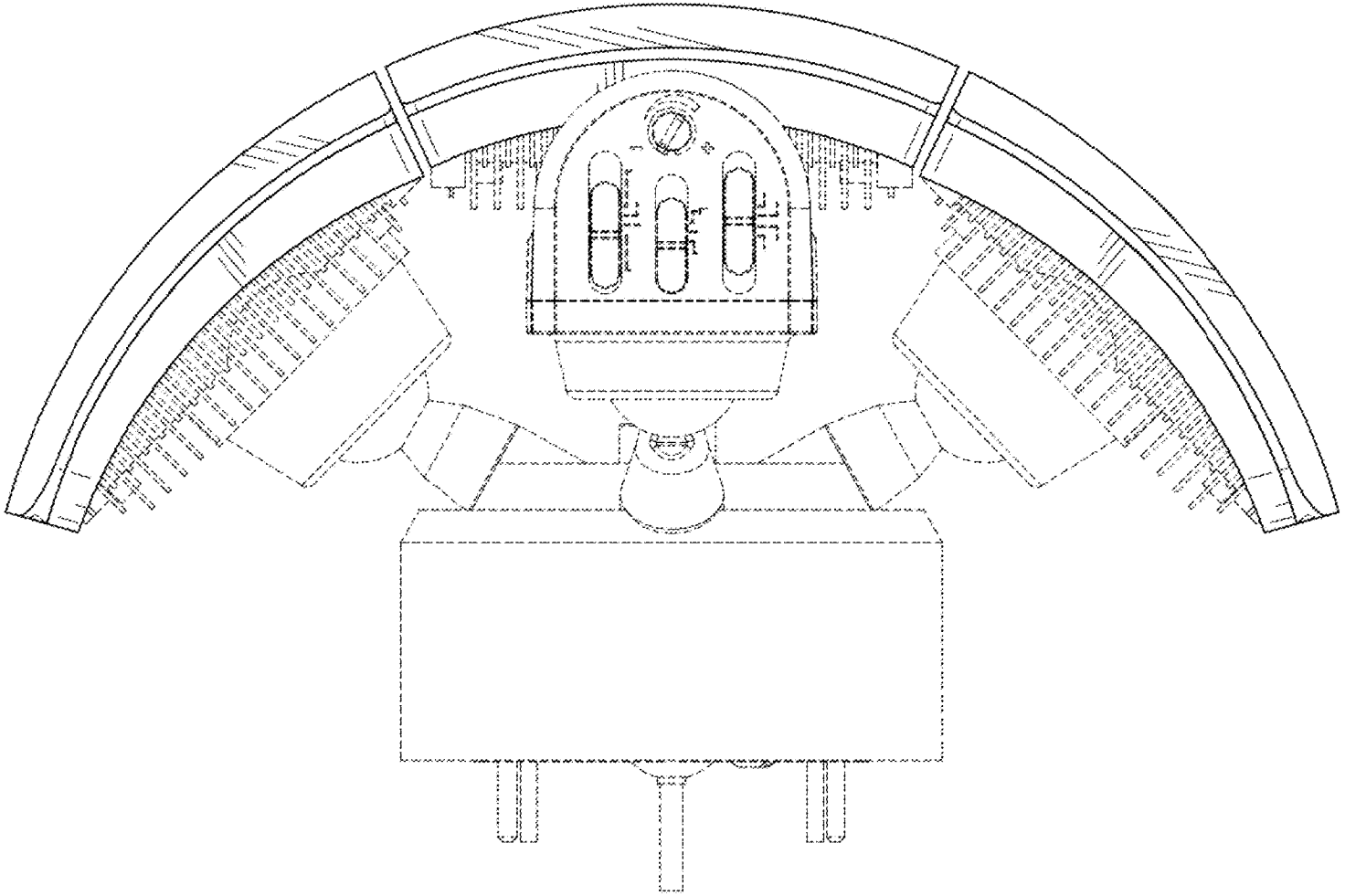

Matter enclosed in heavy brackets [ ] appears in the original patent but forms no part of this reissue; matter printed in italics indicates the additions made by reissue.

(58) Field of Classification Search
CPC .... F21S 8/04; F21S 8/00; F21V 21/00; F21V 17/02; F21V 14/02; F21V 21/30; F21V 21/14; F21V 21/26; F21W 2131/10; G03B 13/196; H04N 5/2251; H04N 5/2253; H04N 5/2254
See application file for complete search history.

(56) References Cited

U.S. PATENT DOCUMENTS

| | | | | | |
|---|---|---|---|---|---|
| D269,210 | S | | 5/1983 | Cutlip | |
| D336,756 | S | | 6/1993 | Meisner | D26/65 |
| 5,649,761 | A | * | 7/1997 | Sandell | F21V 23/0471 362/276 |
| D385,370 | S | | 10/1997 | Moore | |
| D386,801 | S | | 11/1997 | Orgovan | |
| D386,802 | S | | 11/1997 | Kim | D10/109.2 |
| 5,726,706 | A | | 3/1998 | Walsh | |
| D457,540 | S | | 5/2002 | Kieronski | |
| D477,105 | S | | 7/2003 | Herst | |
| D488,105 | S | | 4/2004 | Stahel | |
| D499,823 | S | | 12/2004 | Reiss | |
| 7,168,821 | B2 | * | 1/2007 | Huang | G02C 11/04 24/3.1 |
| D565,786 | S | | 4/2008 | Willmorth | |
| 7,448,779 | B2 | | 11/2008 | Coushaine | |
| D589,640 | S | | 3/2009 | Janssen | |
| D591,444 | S | | 4/2009 | Beno | |
| D595,447 | S | | 6/2009 | Purcell | |
| D598,156 | S | | 8/2009 | Xiao | |
| D599,049 | S | | 8/2009 | Guercio | |
| 7,714,243 | B2 | | 5/2010 | Birdwell | |
| D621,986 | S | | 8/2010 | Yan | |
| D622,886 | S | | 8/2010 | Zheng | |
| D633,646 | S | | 3/2011 | Marcaccio | |
| D636,515 | S | | 4/2011 | Wang | D26/63 |
| D641,097 | S | | 7/2011 | Kocks | |
| D642,319 | S | | 7/2011 | Sprengers | |
| D643,142 | S | | 8/2011 | Kocks | |
| D647,236 | S | | 10/2011 | Chang | |
| D649,198 | S | | 11/2011 | Mims | |
| D656,267 | S | | 3/2012 | Laporte | |
| D656,502 | S | | 3/2012 | Cacioppo | |
| D670,022 | S | * | 10/2012 | Green | D26/128 |
| D670,023 | S | * | 10/2012 | Green | D26/128 |
| 8,317,363 | B2 | * | 11/2012 | Zheng | F21S 8/033 362/239 |
| D683,066 | S | | 5/2013 | Myung | |
| D688,403 | S | | 8/2013 | Landefeld | |
| D708,388 | S | * | 7/2014 | Lee | D26/120 |
| D720,093 | S | * | 12/2014 | Lee | D26/120 |
| D735,927 | S | | 8/2015 | Lee | |
| D745,201 | S | * | 12/2015 | Lee | D26/63 |
| D757,347 | S | * | 5/2016 | Chen | D26/120 |
| D759,291 | S | * | 6/2016 | Chen | D26/120 |
| D761,474 | S | * | 7/2016 | Chen | D26/65 |
| D764,700 | S | * | 8/2016 | Chen | D26/118 |
| D781,481 | S | * | 3/2017 | Chen | D26/65 |
| D784,589 | S | * | 4/2017 | Chen | D26/65 |
| D788,967 | S | * | 6/2017 | Chen | D26/65 |
| D799,104 | S | * | 10/2017 | Chen | D26/120 |
| D804,075 | S | * | 11/2017 | Fang | D26/65 |
| D820,506 | S | * | 6/2018 | Chen | D26/120 |
| D835,834 | S | * | 12/2018 | Paredes | F21S 8/036 D26/120 |
| D866,057 | S | * | 11/2019 | Lafleur | D26/120 |

OTHER PUBLICATIONS

Photograph of product packaging at least as early as Mar. 23, 2017.

* cited by examiner

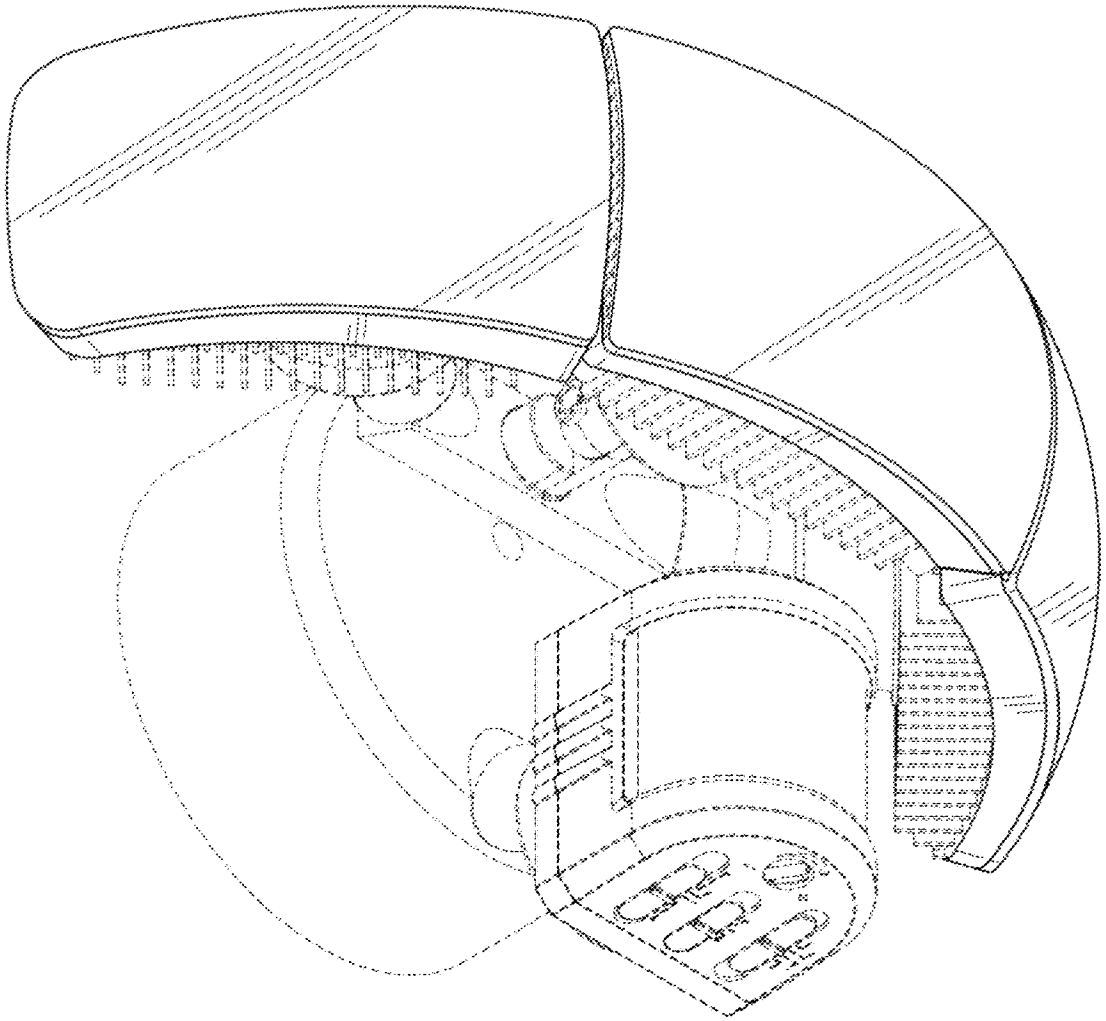
FIG. 1
[AMENDED]

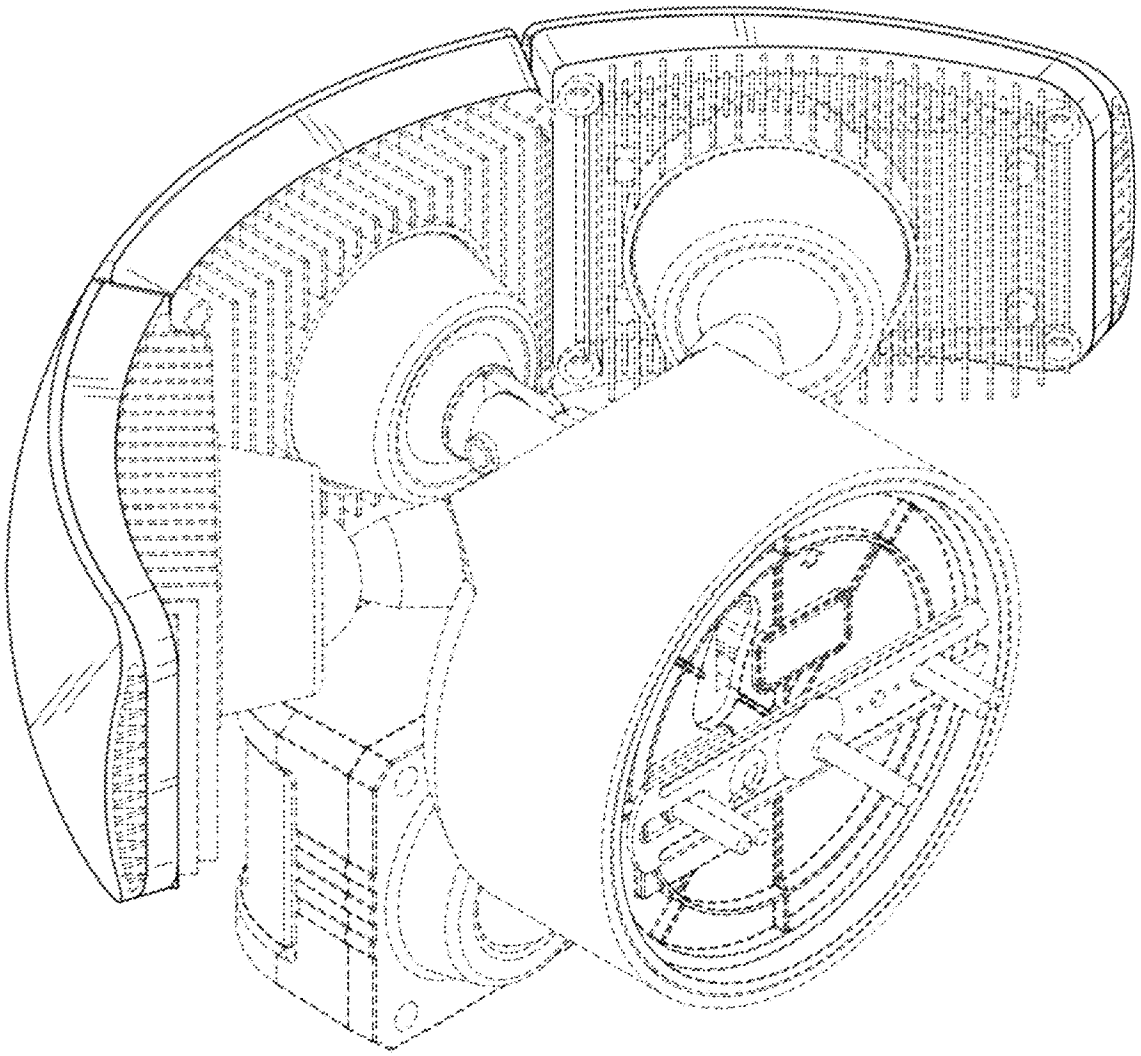
FIG. 2
[AMENDED]

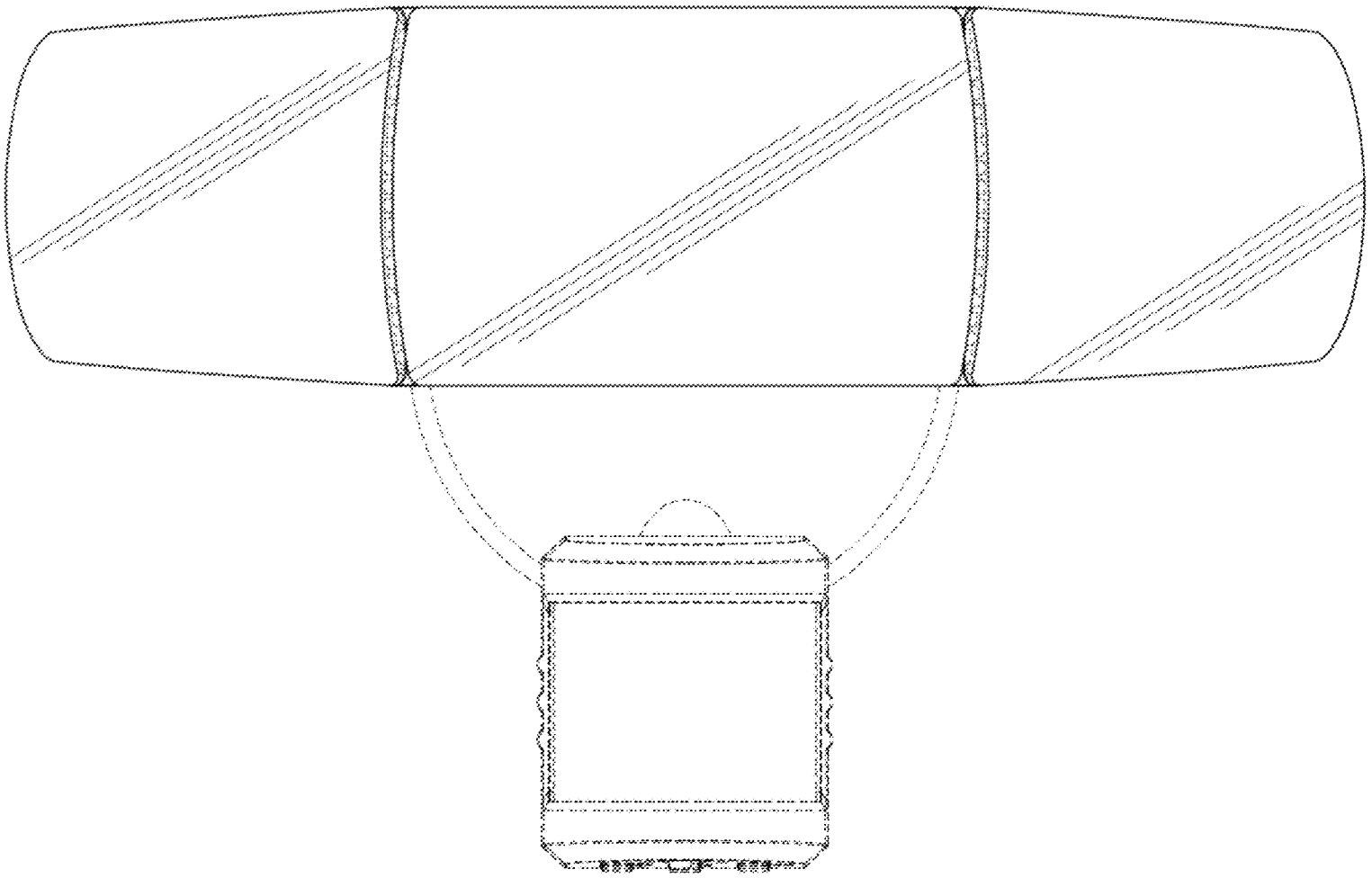
FIG. 3
[AMENDED]

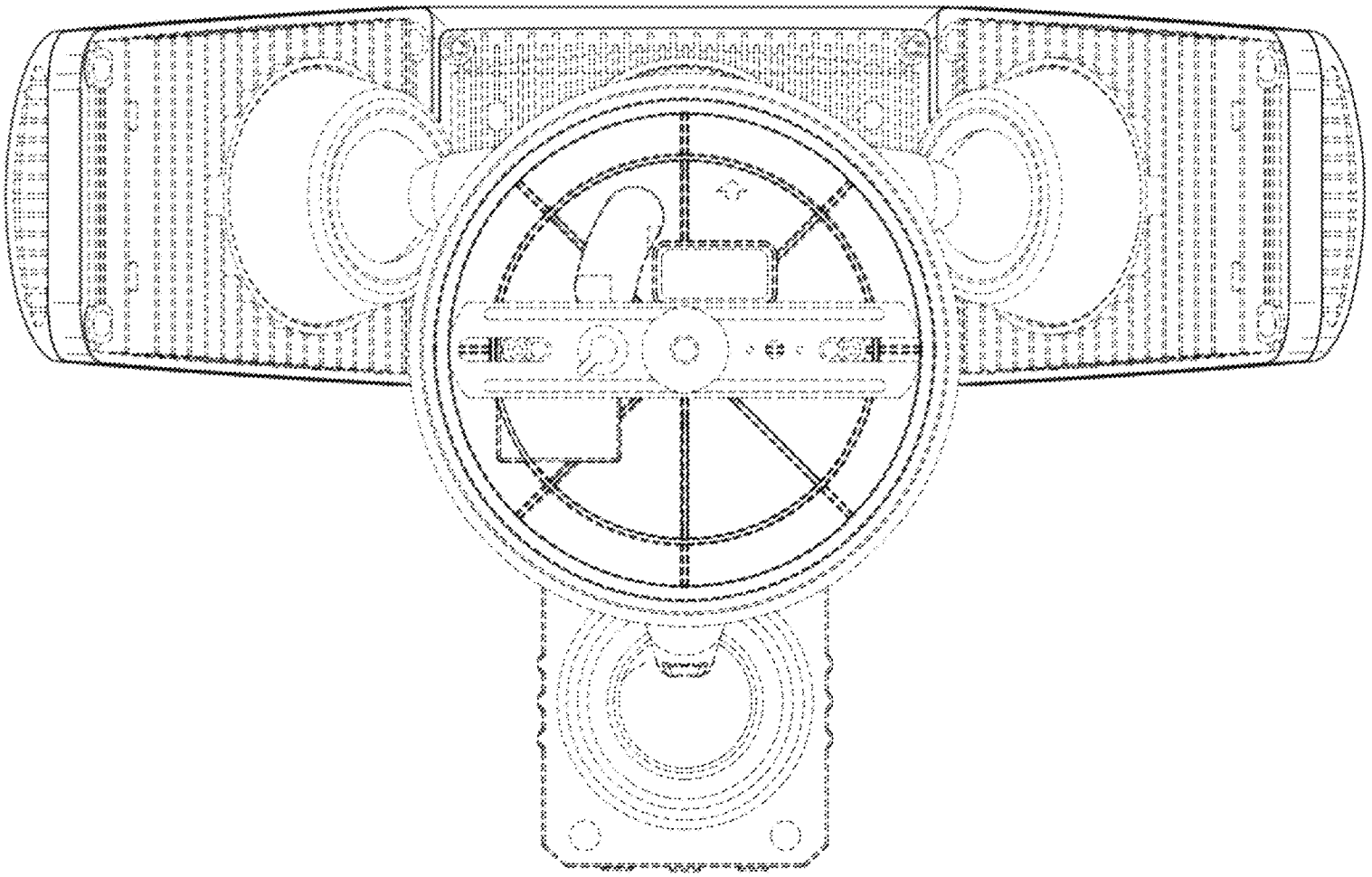
FIG. 4
[AMENDED]

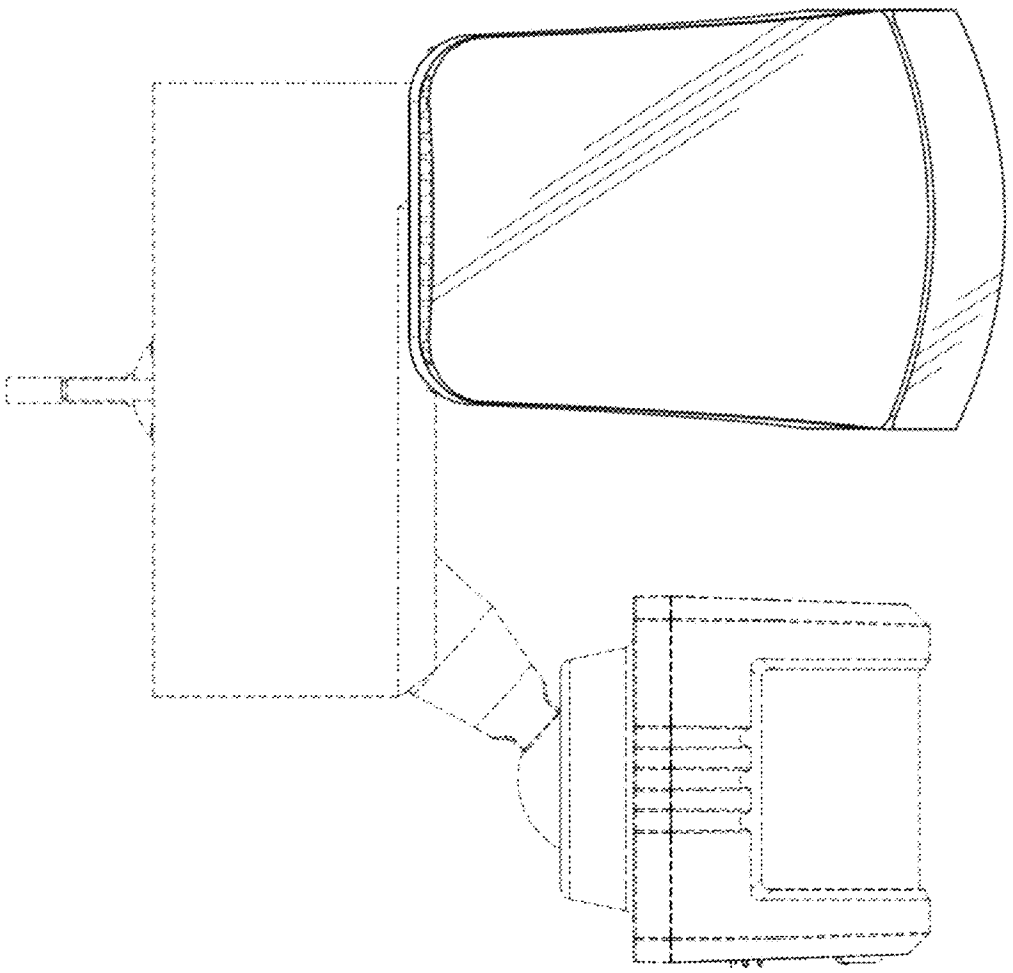
FIG. 5
[AMENDED]

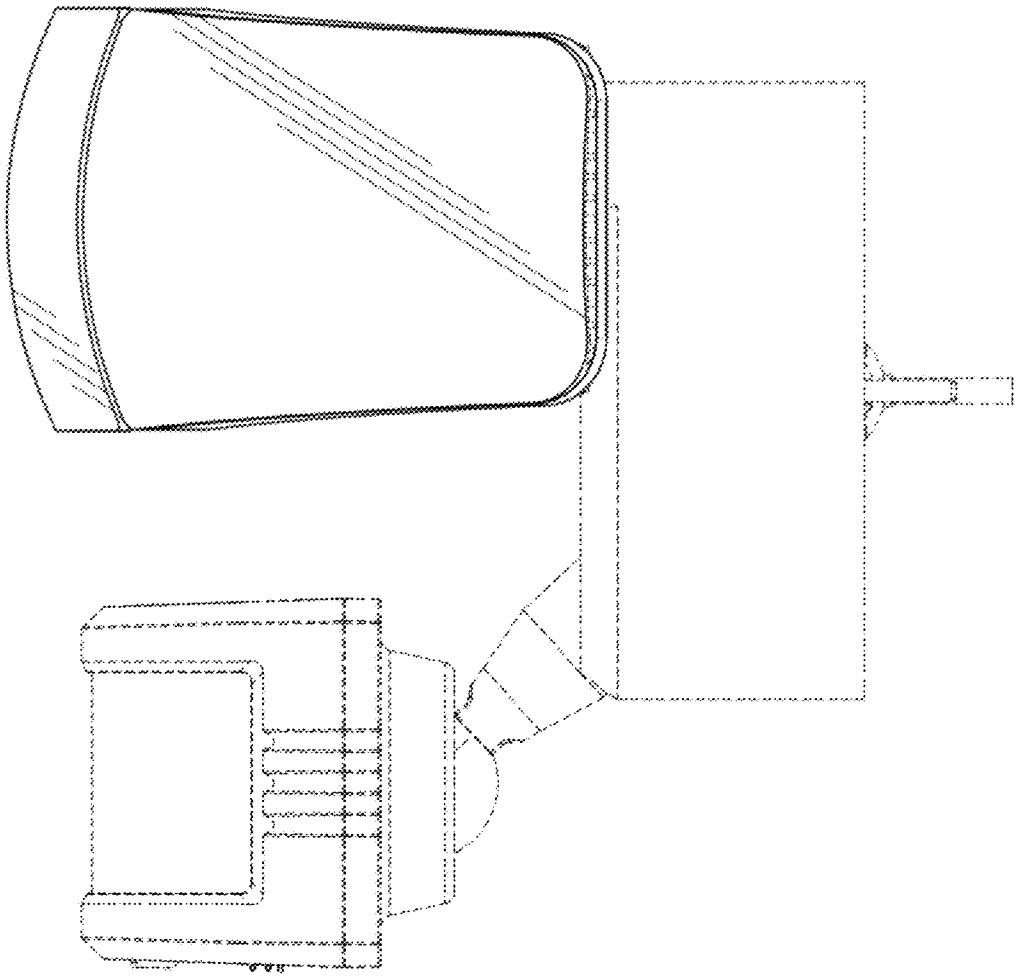
FIG. 6
[AMENDED]

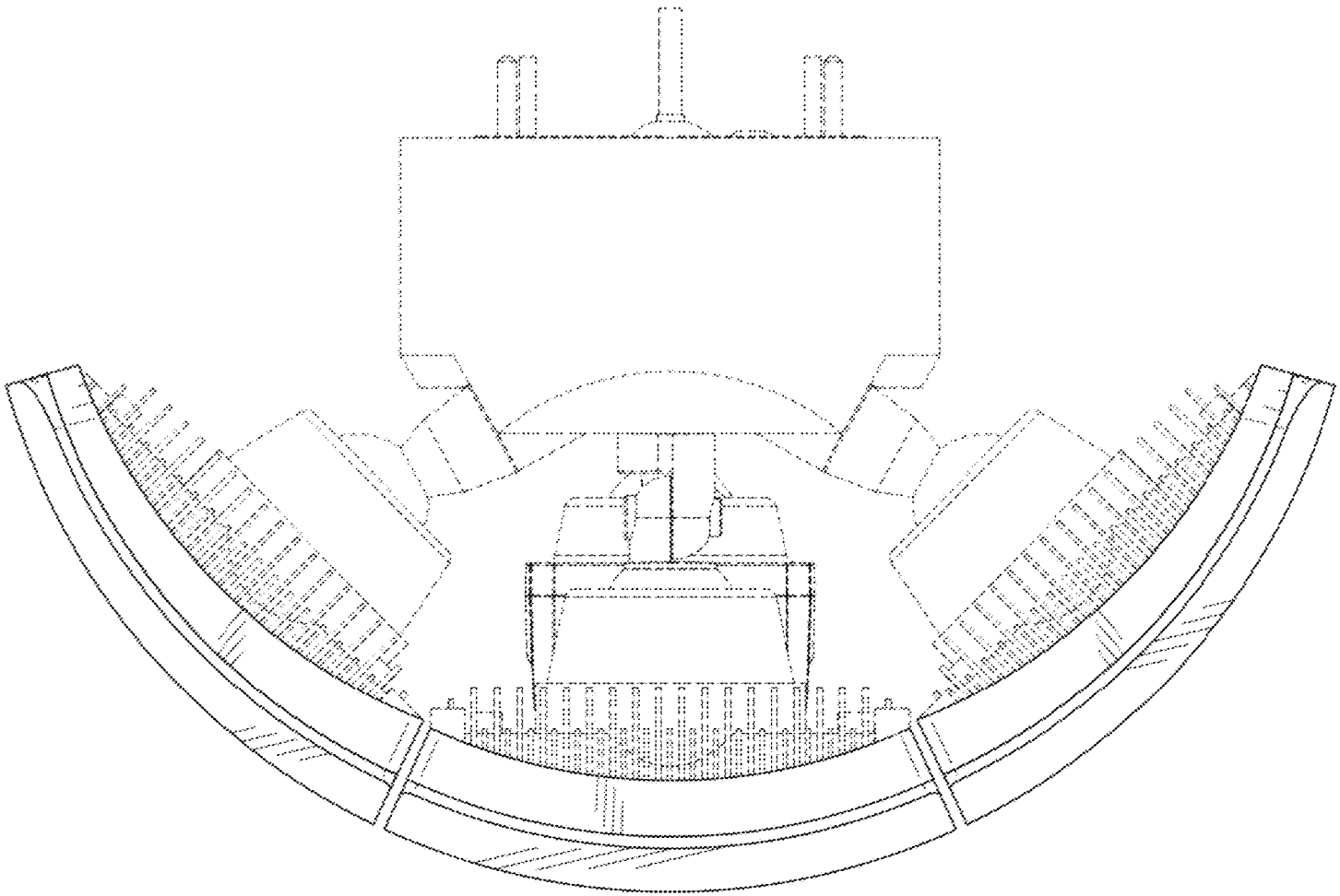
FIG. 7
[AMENDED]

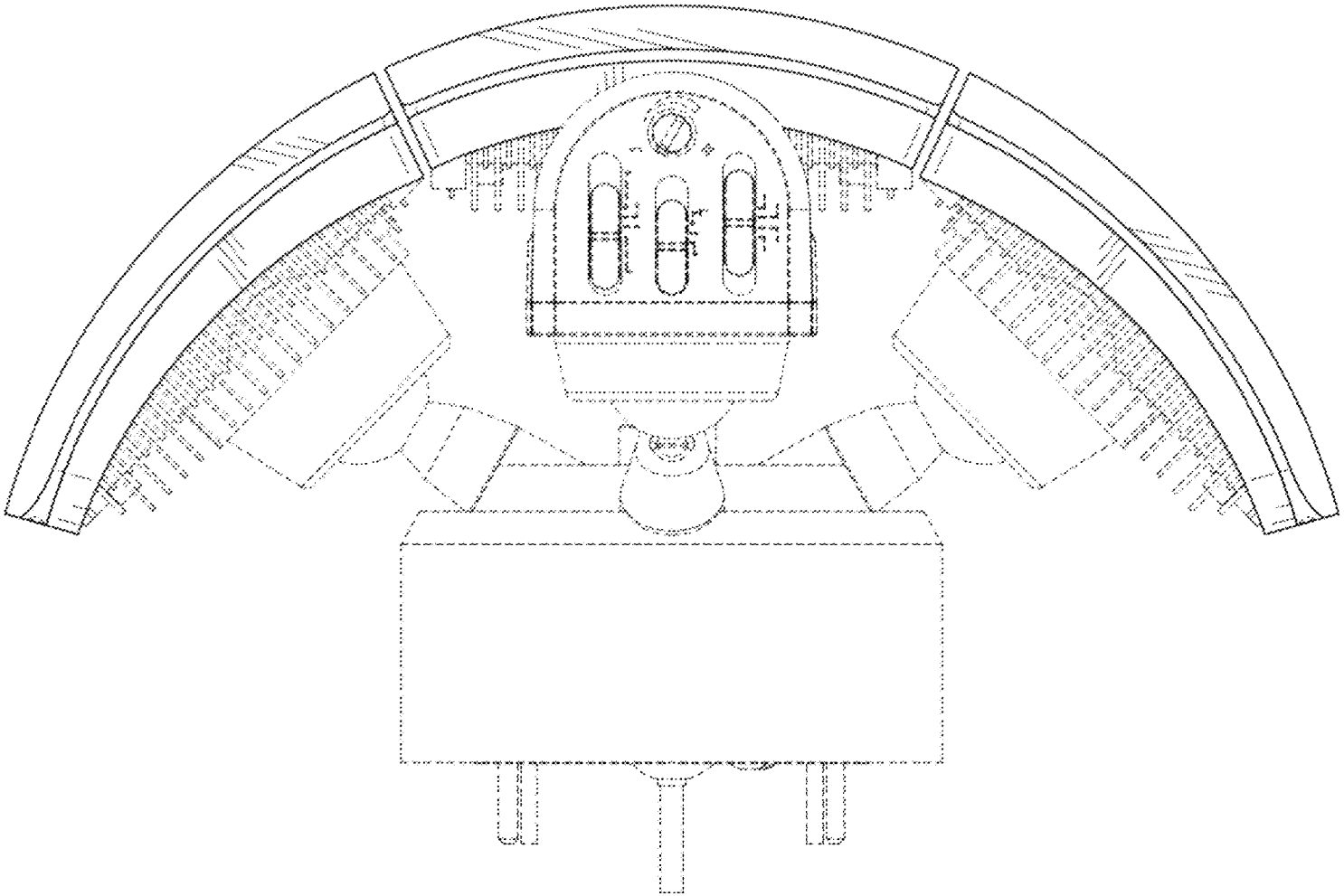
FIG. 8
[AMENDED]

[CANCELED]

[CANCELED]

[CANCELED]

[CANCELED]

[CANCELED]

[CANCELED]

[CANCELED]

[CANCELED]

[CANCELED]

[CANCELED]

[CANCELED]

[CANCELED]

[CANCELED]

[CANCELED]

[CANCELED]

[CANCELED]